March 22, 1966  M. E. J. GENIN  3,241,205
LOCKING DEVICE FOR SAFETY BELT
Filed Dec. 17, 1962  5 Sheets-Sheet 1
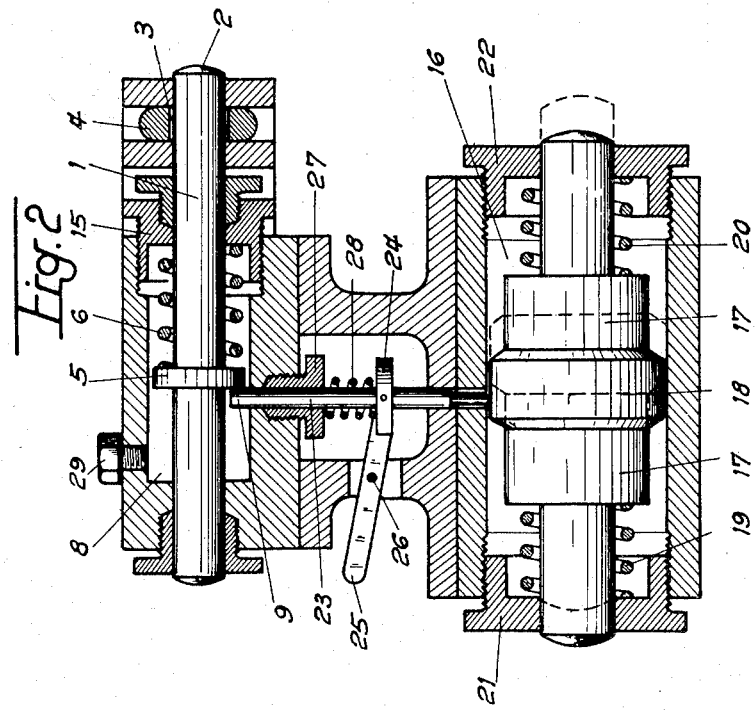
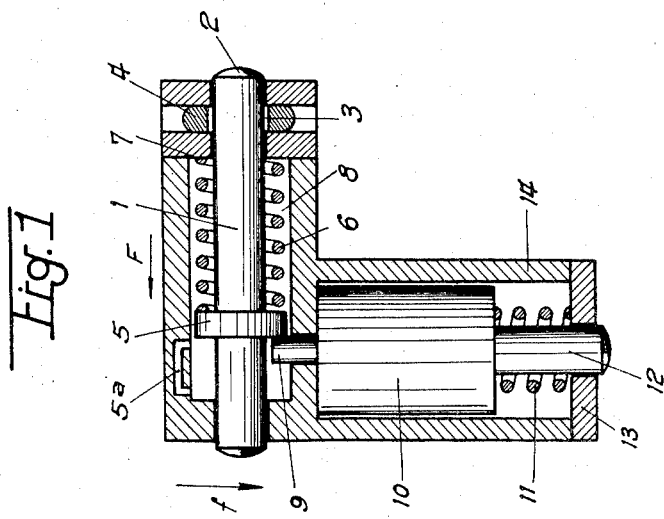
INVENTOR
MARCEL EMILE JOSEPH GENIN
BY
Woodhams Blanchard & Flynn
ATTORNEYS

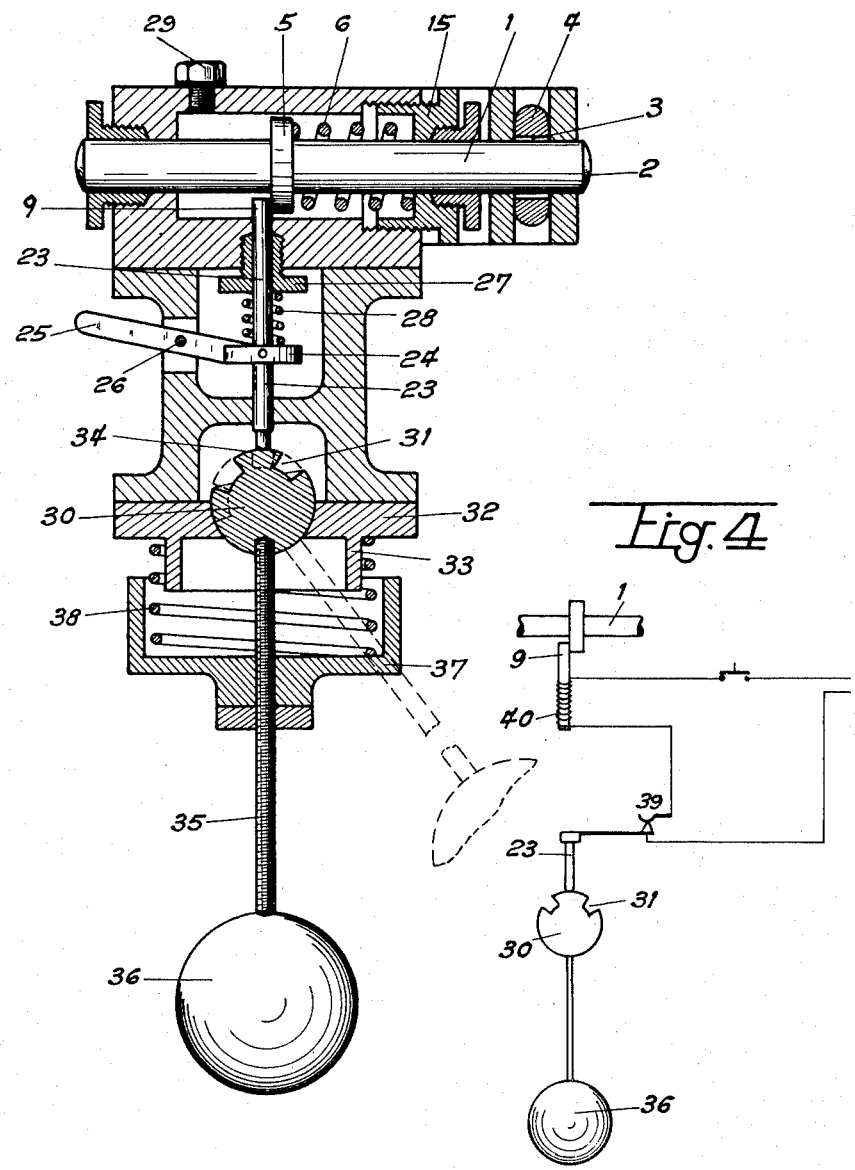

March 22, 1966     M. E. J. GENIN     3,241,205
LOCKING DEVICE FOR SAFETY BELT
Filed Dec. 17, 1962     5 Sheets-Sheet 3

INVENTOR
MARCEL EMILE JOSEPH GENIN
BY
Woodhams Blanchard & Flynn
ATTORNEYS

March 22, 1966  M. E. J. GENIN  3,241,205
LOCKING DEVICE FOR SAFETY BELT
Filed Dec. 17, 1962  5 Sheets-Sheet 4
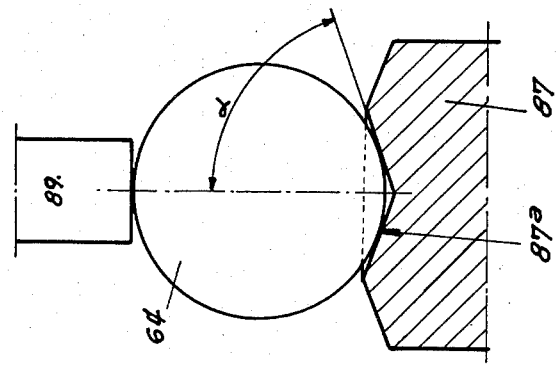
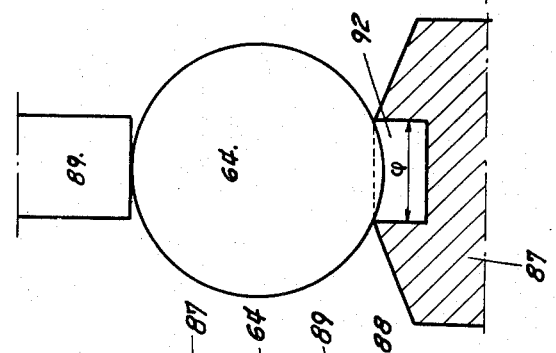
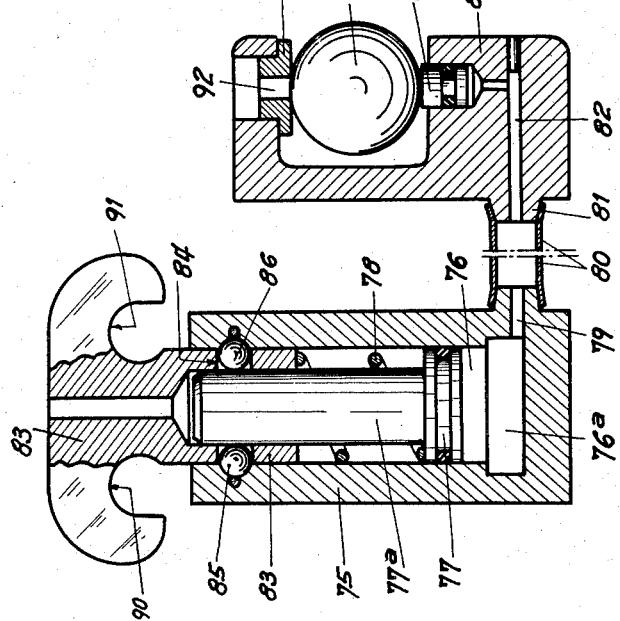
INVENTOR
MARCEL EMILE JOSEPH GENIN
BY
Woodhams Blanchard & Flynn
ATTORNEYS

3,241,205
LOCKING DEVICE FOR SAFETY BELT
Marcel Emile Joseph Genin, 16 Rue Louise Aglae Crette, Vitry, France
Filed Dec. 17, 1962, Ser. No. 245,125
Claims priority, application France, Dec. 19, 1961, 882,448, Patent 1,318,653; Oct. 16, 1962, 912,429, Patent 82,448
9 Claims. (Cl. 24—230)

Safety belts for automobile passengers have recently come into more widespread use with a view to ensuring that, in the event of impact or accident, passengers are prevented from being thrown dangerously against hard parts of the vehicle body such as, for example, the dashboard or windshield.

It is necessary to ensure, however, that safety belts of this type can be rapidly unfastened, for example in order that the user can quickly be released from his belt and leave the vehicle in the event of accident, or in order that rescuers are able to carry out the same operation irrespective of the condition and position of said user, or the pull applied by said user on the belt and the lack of experience of the said rescuers.

In order to meet these requirements, the present invention has for its object to effect the automatic release of a safety belt when the vehicle has been subjected to a certain force of impact.

Another object of the present invention is to effect a releasing operation of this type which is non-reversible, that is to say in which the locking device is not liable to re-engage when once the releasing operation has been effected following an impact.

The invention also has for its object a release of the type referred-to above which is carried into effect only under the action of a certain force of impact in such manner as to ensure that the safety belt remains fastened around the passenger under normal conditions, even if the driver of the vehicle has been compelled to apply the brake in a violent manner.

Yet another object of the present invention is to produce a release of the belt which is carried into effect only a certain time after the impact which can be preferably regulated, in such manner that, in the very great majority of cases, the release of the belt only becomes effective after stoppage of the vehicle involved in an accident.

In order to give practical effect to these different objects and others as well which will become apparent in the course of the present description, an unlocking device in accordance with the invention substantially comprises in combination a movable bolt which is adapted to co-operate with the belt for the purpose of locking this latter in position of use and a member which is responsive to the deceleration of the vehicle and which is capable of producing action on said bolt with a view to ensuring that the co-operation of said bolt with the belt no longer takes place. The member which is responsive to deceleration can be a weight which is capable of rectilineal motion or pendular motion. In accordance with a first form of embodiment of the invention, the bolt is movable axially and continuously urged by an elastic means towards the withdrawn position thereof in which the belt is free, and a locking member produces action so as to retain said bolt in the engaged position in opposition to said elastic means. The weight which is responsive to deceleration produces action on said locking member.

It is of course necessary to ensure that a device in accordance with the invention does not come into action so as to produce the unlocking of the belt at each deceleration and even the smallest deceleration of the vehicle.

In accordance with one characteristic feature of the invention which is intended to overcome this drawback, the member which is responsive to deceleration is subjected to the action of an oppositely-acting device in such manner that the unlocking action takes place only in the event of a deceleration having a value which is higher than a pre-determined threshold value which can preferably be regulated.

Similarly, it is advantageous to ensure that when the threshold value of the deceleration has been exceeded, the unlocking action is subject to a certain delay relatively to the deceleration.

In accordance with one characteristic feature of the invention which can be employed either alone or in combination with one or a number of the characteristic features which have been described in the foregoing, the arrangement and assembly of the bolt are so designed that the movement of said bolt is subject to a time-delay with respect to the moment when the deceleration is at maximum value, in such manner that, since the said time-delay can be regulated, the safety belt is only released after the time which is necessary for the vehicle to come to a stop.

In another form of embodiment of the invention, the weight of the user causes the device to come into action following a deceleration which is greater than the threshold value. The pull applied by the user's body releases a member which is elastically controlled and which is capable of unlocking a hook which fastens the belt to the vehicle.

Finally, it comes within the scope of the invention to place in any part of the vehicle a control member which is responsive to deceleration, while the unlocking device itself is naturally associated with the safety belt.

Further characteristic features and advantages of the present invention will be brought out by the description which follows below, reference being made therein to the accompanying drawings which are given by way of example and not in any sense by way of limitation, and in which:

FIG. 1 is a diagrammatic view in cross-section illustrating the principle of the present invention;

FIG. 2 is a view in cross-section of one form of embodiment of said invention;

FIG. 3 is a view, also in cross-section, of another form of embodiment;

FIG. 4 illustrates a mode of electric control of the unlocking member;

FIG. 7 is a view in elevation and partly in cross-section;

FIGS. 8 and 9 are detail views; and

Figure 5:
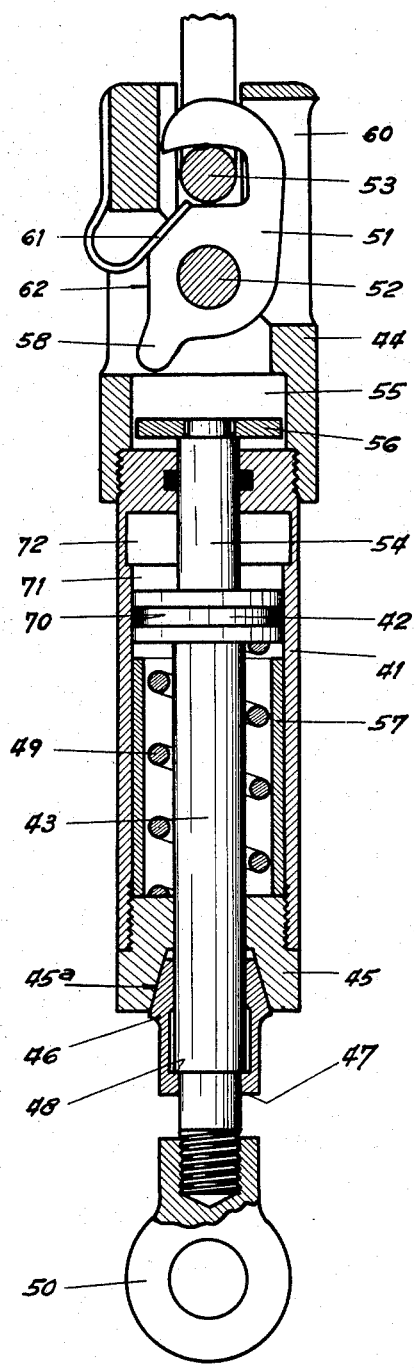
FIGS. 5 and 6 are two longitudinal cross-sections of two other forms of embodiment.

As shown in FIG. 1, a device in accordance with the invention essentially comprises a locking bolt 1 in the form of a rod, one end 2 of which is adapted to pass through the opening 3 which is formed in the belt 4 so as to retain said belt in the position of closure. In particular, the rod 1 can replace the catch of an ordinary buckle while the hole 3 is pierced at one end of the belt and the other end of said belt is rigidly fixed to the body of the device. The rod 1 is provided with an annular flange 5, and a spring 6 is interposed between said annular flange 5 and the base 7 of a cylinder 8 inside which said rod is adapted to move. It will be noted that the external diameter of the annular flange 5 is slightly smaller than the internal diameter of the cylinder 8. Under these conditions, the rod 1 tends to move in the direction of the arrow F and in consequence, the extremity 2 of said rod has a tendency to pass out the opening 3 of the belt 4 so as to release this latter.

The device is held in the belt-locking position by virtue of a finger 9 which is formed on the mass 10 and which normally fits in position on the opposite side of the annular flange 5 with respect to the belt 4. The mass 10 is held by a spring 11 in that position in which the finger 9 is placed behind the annular flange 5 so as to block the rod 1 in the locking position of said belt.

The axis of the mass 10 is located parallel to the axis of the vehicle which is considered as moving in the direction of the arrow f.

It will be assumed that an impact produces a sufficiently intense and sudden deceleration of the vehicle to cause the mass 10 to continue with normal acceleration and accordingly to compress the spring 11, whereupon the finger 9 is withdrawn from the path of the annular flange 5, with the result that the said annular flange 5, conjointly with the rod 1, moves towards the left hand side in the direction of the arrow F under the action of the spring 6. The result of this process is that the extremity 2 of said rod no longer penetrates inside the opening 3 of the belt 4 and that this latter is accordingly unlocked. This unlocking process is non-reversible since in point of fact, the deceleration having become zero, the mass 10 again responds to the action of the spring 11 and the finger 9 again projects from the interior of the cylinder 8 but this time on the opposite side of the annular flange 5, with the result that this latter can no longer be locked.

The system can be restored to the operating position thereof, on the one hand by applying a tractive effort on the rod 12 which is located axially opposite to the finger 9 and, on the other hand, by pushing back the bolt 1 towards the right hand side of the drawing in such manner as to cause the extremity 2 of said bolt to penetrate again inside the opening 3 of the belt 4.

Note will be taken of the presence of the spring 11 which acts in such manner that a deceleration of relatively low value such as that which results from a braking action applied with medium force does not result in a displacement of the mass 10 which is sufficient to unlock the rod 1. It will be possible, moreover, to make this action adjustable by designing the cover 13 so that this latter can be mounted by screwing on the body of the chamber which contains the mass 10.

Moreover, a vehicle which is involved in an accident can continue to travel for a certain period of time, for example, by overturning, after the deceleration rate has reverted to a normal value and the finger 9 has accordingly been actuated so as to unlock the rod 1; however, it is preferable that the safetly belt should remain locked in position as long as the vehicle has not come to a standstill.

It is therefore advantageous to apply a time-delay to the movement of withdrawal of the bolt 1 and this can be produced in a simple manner by filling the chamber 8 with oil of suitable viscosity. In fact, the bolt 1 and the annular flange 5 thereof can only move in the direction of the arrow F insofar as the oil is displaced in the opposite direction by being subjected to a wiredrawing action between the lateral cylindrical face of the annular flange 5 and the internal face of the chamber 8.

The end of the movement can be made more rapid by providing a by-pass 5a which is uncovered at the end of travel by the annular flange 5.

The form of embodiment which is illustrated in FIG. 2 is based on the same principle as the form of embodiment of FIG. 1 and there is again met with the bolt 1, the extremity 2 of which penetrates inside the opening 3 of the belt 4. The bolt 1 is also provided with the annular flange 5, and the spring 6 is interposed between the cover 15 and the annular flange 5, the said cover 15 being screwed into the wall of the chamber 8, thereby making it possible to vary the strength of the spring 6.

The member which is responsive to deceleration consists of a mass which is adapted to move inside the cylinder 16, said mass and said cylinder having their axes parallel to the axis of the vehicle.

The mass which is responsive to deceleration consists of a cylindrical body 17 comprising an annular overthickness 18. The said mass is subjected to the actively opposing action of two oppositely mounted springs 19 and 20 which bear respectively against the screw covers 21 and 22 which close the chamber 16, with the result that the strength of each spring can be regulated individually by screwing or unscrewing of the corresponding cover.

The unlocking member is in this case constituted by a rod 23 which terminates in the finger 9, the said rod carrying a plate 24 which is subjected to the action of a fork 25 which is pivotally mounted at 26 on the casing of the apparatus. Between the sealing joint 27 and the plate 24 is interposed a spring 28 which tends to thrust the rod 23 against the mass 17, 18.

In this form of embodiment, the mass 17, 18 carries out a movement only in the case of a deceleration having a threshold value which is a function of the strength of the spring 19 or 20, depending on the direction in which said deceleration is applied. When this latter reaches a sufficient value, the rod 23 comes to bear against one of the portions 17 of smaller diameter under the action of the spring 28. At this moment, the finger 9 is withdrawn, with the result that the bolt 1 moves freely towards the left under the action of the spring 6; the safety belt is accordingly unlocked.

It is therefore found that, in this form of embodiment:

(1) the safety belt is unlocked, whether the impact occurs at the front of the vehicle or at the rear of this latter (impact produced by another vehicle colliding with the rear end at a much higher speed;

(2) the said device only comes into action beyond a threshold value which is in any case adjustable;

(3) the unlocking action is effective only when a certain time has elapsed after the withdrwal of the finger 9, this time-delay being achieved by filling the cylinder 8 with oil through an opening which is formed in the wall thereof and which is closed by means of the screw cap 29.

Moreover, the boss 18 need not be in a central position but can be located nearer to one of the covers 21 or 22, thereby determining two different threshold values, one corresponding to a frontal impact, the other corresponding to an impact from the rear; this results in this case from the difference in the distance which the mass 17, 18 have to travel in order to release the finger 23, the said difference corresponding to a difference in tension of the springs.

It will be noted, however, that the said device does not come into operation in the case of a lateral impact or in the case of an impact in which the lateral component is predominant.

In order to avoid this disadvantage, it is possible to construct a device which is responsive to deceleration in the manner which is shown in FIG. 3. In this form of embodiment, the elements which have already been described with reference to FIG. 2 are again met with and need not therefore be described further. The rod 23 is applied against a spherical element 30 in which there has been formed a circular groove 31. The said groove can assume different shapes depending on the particular conditions of operation.

The said sphere 30 rests inside an opening of corresponding shape formed in the plate 32 which is integral with the casing of the apparatus and which is additionally provided with an axial annular flange 33.

A threaded rod 35 is intended to be screwed into the spherical mass 30, and preferably in a position which is diametrically opposite to that of the head 34, while at the opposite end of said threaded rod is fitted a mass 36 forming a pendulum body.

The swinging movement of said pendulum are braked by a device which comprises a cap 37 which is screwed onto the rod 35 and a spring 38, one end of which is applied against the plate 32 and the other end of which is applied against the bottom of the cap 37, and which is guided by the annular flange 33. The movements of the pendulum constituted by the knuckle-joint suspension 30, the rod 35 and the mass 36 will be more damped-down as the spring 38 is subjected to a greater degree of compression. This compression is regulated by screwing or unscrewing of the cap 37 on the rod 35.

Over and above a particular threshold value of deceleration which is a function of the damping of the pendulum, any deceleration produces a swinging movement of said pendulum which is such that the rod 23 is brought to bear on the bottom of the groove 31; as will be immediately made clear in the drawing, this position corresponds to the movement of withdrawal of the finger 9 and consequently to the withdrawal of the bolt 1.

It is observed that, in addition to the advantages which have been specified as regards the form of embodiment in accordance with FIG. 2, the present form of embodiment has the additional advantage of being responsive both to transverse shocks or impacts as well as to longitudinal shocks.

The devices which have been described in the foregoing are individual devices, that is to say, one device is associated with one safety belt alone; it can be useful to provide for a single device such as that of FIG. 3 and to transmit the indications of the pendulum either by mechanical means, compressed-air means or electric means to all the locking devices of safety belts provided in a same vehicle.

It can readily be imagined, for example, that the withdrawal of the finger 9 can have the effect of opening a valve for the circulation of a fluid which is connected by means of a corresponding number of pipes to the various cylinders 8 of individual unlocking devices, the fluid under pressure which is thus admitted inside said cylinders being capable of producing action on the annular flange 5 so as to displace this latter as well as the bolt 1.

It is also possible, as shown diagrammatically in FIG. 4, to associate an electric contact 39 with the rod 23 of the form of embodiment of FIG. 3 in such manner that, when the said rod is brought to bear against the bottom of the groove 31, the contact 39 is opened. If it is assumed that the finger 9 is normally held in the locking position of the rod 1 by a normally-energized electromagnet such as the electro-magnet 40, this latter no longer remains energized when the deceleration has passed beyond the threshold value and the contact 39 is consequently opened. At this moment, the finger 9 withdraws as a result of its own weight or under the action of the spring 28, and the bolt 1 is able to move into the unlocked position. It will naturally be understood that the rod 1 and the finger 9 are mounted in a manner which is similar to that illustrated in FIG. 3, especially with a view to effecting the time-delay of the unlocking action proper.

The various electro-magnets such as the electro-magnet 40 of each of the safety devices can be mounted either in parallel or in series so as to be controlled by a single pendular mass such as the mass 36.

The device in accordance with FIG. 5 mainly comprises a hollow cylindrical body 41, in the interior of which there moves a piston 42, the rod 43 of which projects from one of the ends of said cylinder while the other end of said cylinder 41 is rigidly fixed to a head 44 which will be described in greater detail below.

At that extremity which is located opposite to the head 44, the said cylinder is closed by a plug 45 in which is fitted a conical collet 46 on which is formed an annular flange 47 which is applied against a radial surface 48 formed in the piston-rod 43. The conical external surface of said collet 46 is intended to co-operate with the internal conical face of a bore 45a which is coaxial with the general longitudinal axis of the apparatus and which is formed in the plug 45, with the result that the piston rod is thus held rigidly locked in position.

A spring 49 is interposed between said plug 45 and the piston proper 42 so as to tend to bring back said piston towards the top of the figure; the piston rod 43 terminates in a ring 50 which can be attached at any point of the car.

A hook 51, which is capable of pivoting about a pin 52 which is integral with the head 44, is mounted in the interior of the said head. The hook 51 is adapted to engage over a buckle 53 which is made integral with the belt by any suitable means. On the other side of the piston 42, the rod 43 is extended by a rod 54 which projects beyond the cylinder 41 so as to penetrate inside a bore 55 of the head 44. Inside said bore 55, the rod 54 is integral with a plate 56, while the pivot-pin 52 and the hook 51 referred to above are also placed inside said bore 55.

The said device operates in the following manner:

In the event of an abrupt deceleartion, and if the traction applied on the belt by the user's body exceeds the tension of the spring 49, the piston drops a few millimeters before coming into abutment with a tube 57 which is placed inside the cylinder 41; this relative downward movement of the piston and of the piston-rod 43 has the effect of disengaging the collet 46 which releases the piston and the piston-rod 43, whereupon the piston moves upwards in the opposite direction in such manner that the plate 56 is brought to bear against the bottom tailpiece 58 of the hook 51 and causes this latter to perform a pivotal movement. This movement completely disengages the ring 53 and releases the safety belt; during this pivotal movement of the hook 51, this latter moves aside into the opening 60 which is formed laterally in the head 44 and which communicates freely with the bore 55.

The arcuate spring 61 so acts as to prevent any return movement of the hook towards the position of closure on account of the fact that, after the pivotal movement of said hook about the pivot-pin 52 has taken place, the free portion of said hook 61 finally co-operates with the face 62 of the tailpiece of said hook.

It will be observed that, under the violent tractive effort applied as a result of the forward displacement of the user's body, the belt stretches very slightly and thus prevents a violent shock which would be liable to result in the failure either of the belt or of its fastening device. On the other hand, as soon as the piston moves upwards again, the belt is tightened and firmly applies the driver's body against the seat.

The effort F at which the spring 49 is set must be proportional to the weight of the user. It is therefore possible to make provision for a regulating device by means which the strength of the spring can be regulated or by means of which a number of successive springs can be employed in such manner as to ensure that the releasing action can take place under stresses having different values according to the weight of the user.

In the device of FIG. 6, there is again shown a piston 42, on each side of which is located the rod 43 which projects from both ends of the cylinder 41; in this example also, the spring 49 is also interposed between the piston 42 and the top face 63 of the cylinder. The bottom end of the rod 43 is brought to bear on a ball 64 which is placed between the bottom extremity of said rod 43 and a nipple 65 which is integral with the stirrup 66, the said stirrup being in turn screwed onto the bottom end of the cylinder 41; the said ball is prevented from moving freely, for example by virtue of the fact that said ball bears on two small hollowed-out portions, one of which is formed in the end of the rod 43 while the other hollowed-out portion is formed in the top brace of the nipple 65.

There will also again be found in this form of embodiment of the invention the head 44 which is screwed onto the top end of the cylinder 41, provision being made in said head for the hook 51 which is adapted to pivot about the pin 52 and which is intended to grip the buckle 53 of the safety belt. In this example, however, the said hook is provided with a tailpiece 67 which is on contact with the extremity of the piston-rod 43 and which is applied against said rod by the arcuate spring 68.

Figure 10:
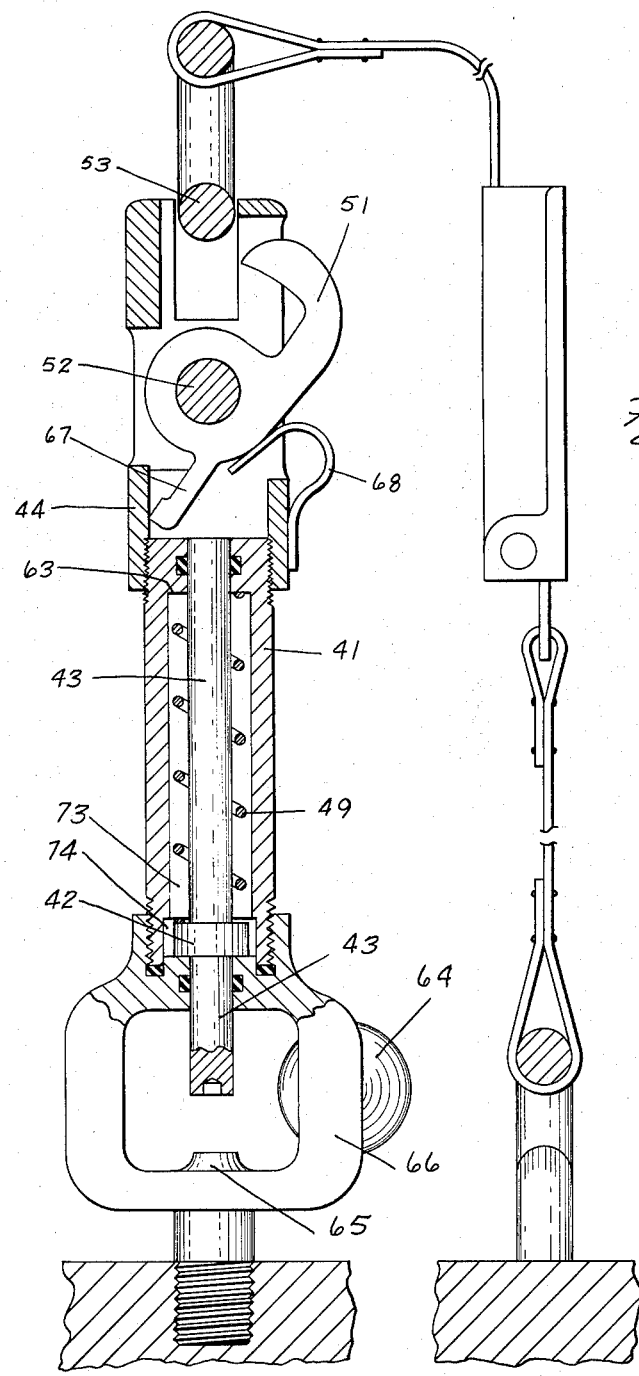
FIG. 10 is a longitudinal cross-section of the embodiment of FIGURE 6 including a belt and shown in a different position of operation.

This device operates in an extremely simple manner. It is attached to the car by means of a fixation device 69. In the event of an abrupt deceleration, the ball 64 escapes from its housing (FIGURE 10) and since the rod 43 is no longer retained, the spring 49 expands and causes the piston-rod 43 to move downwards. This downward movement releases the tailpiece 67 of the hook 51 and this latter being thrust back by the spring 68 disengages the hook from the ring 53. At this juncture, all connection between the passenger's belt and the vehicle body is broken.

It will be understood that the value of deceleration at which the ball 64 is displaced depends on the pressure applied by the spring 49 against the piston and against the piston-rod.

In the form of embodiment of FIG. 5, the time-delay action is obtained especially by reason of the fact that inasmuch as the piston 42 is fitted with an O-ring seal 70, the air cannot escape downwards along the lateral surface of the piston; said air is therefore compressed inside the chamber 71; when the piston reaches the end of its travel and accordingly penetrates inside the space 72 of larger diameter, the air which was initially compressed is permited to escape between the piston and the lateral wall of said enlarged portion 72.

Furthermore, the delaying action is accentuated by the friction which results from the presence of the O-ring seal. Finally, the constructional design is such that no action is applied by the plate 56 against the tailpiece 58 during the entire time of upward movement of the piston which is delayed in the manner which has been described above.

Figure 6:
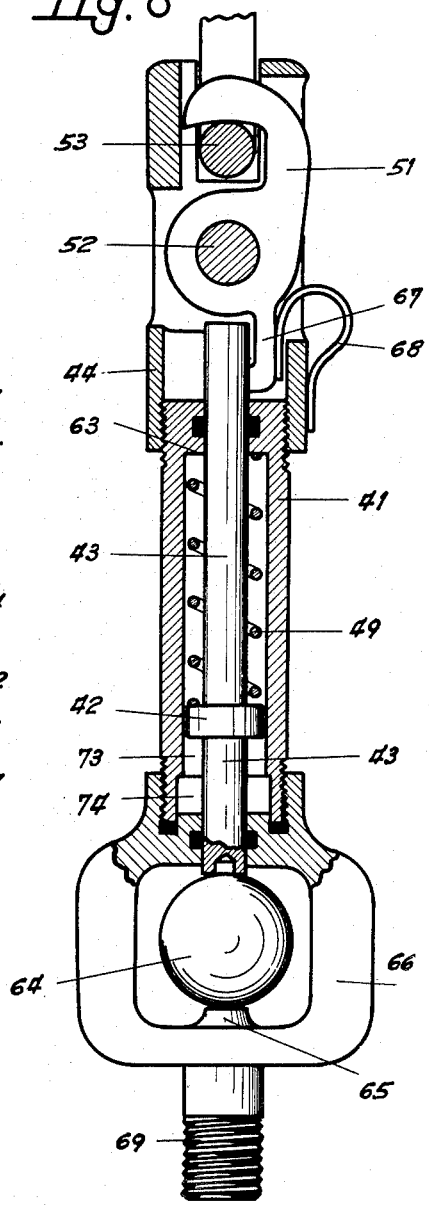

In the form of embodiment of FIG. 6, use can be made of a hydraulic time-delay system similar to that which has already been indicated in the main patent. To this end, oil can be provided inside the chamber 73 which is formed between the bottom face of the piston and the bottom end of the cylinder 41; the said oil is compressed by wiredrawing between the piston 42 and the body 41. On the other hand, the oil escapes freely at the end of travel of the piston 42 when this latter penetrates inside the space 74 of larger diameter.

In the form of embodiment of FIG. 7, there is again shown a spherical mass 64 constituting the member which is responsive to deceleration and mounted in such manner as to respond to shocks originating from any direction.

In this example, the device is mounted as two units, one of which is fitted with the ball 64 and constitutes the device for controlling the unlocking action while the other unit constitutes the unlocking device proper. The said device comprises a body 75 inside the internal bore of which is provided a certain quantity of oil 76, the said bore being closed by a fluid-tight piston 77 against which pressure is applied by the spring 78. The said chamber communicates through a spigot-joint 79 with a pipe 80 which is also fitted over a spigot-joint 81 which terminates the conduit 82 of the control device which will be described below.

The element which permits the fixation of the buckles which are fastened to the belt is constituted by a member 83 against which is also applied the spring 78 while the said member which penetrates inside the bore of the body 75 comprises an axial bore inside which penetrates the piston-rod 77a and openings such as the opening 84 in which are fitted balls such as 85 and 86 which are also fitted, as shown in the drawing, in a corresponding groove of the body 75.

In the control device, the spherical mass 64 is held between a top jaw 87 and a bottom jaw 88 against which said mass is applied by means of a piston 89, the internal face of which is supplied with oil under pressure through the conduit 82.

It is observed that, if the strength of the spring is designated by F, the surface area of the piston 77 is designated by S and the surface area of the piston 89 is designated by $s$, the ball is compressed between these two seatings by a force which is equal to $Fs/S$.

The member 83 is provided with two hooks 90 and 91 to which there can be attached one or two rings of the safety belt.

When the ball 64 is driven out as a result of a substantial deceleration, the piston 89 moves upwards under the pressure of the oil and the piston 77 moves down at the same time as the piston-rod 77a under the action of the spring 78, thereby driving out the oil; this downward movement is relatively slow, therefore delayed, and when the piston 77 reaches the bottom of its travel and accordingly accelerates by reason of the fact that the bottom portion 76a of the bore 76 has a larger diameter, thereby also permitting the oil to flow to the other side of the piston, the rod 77a frees the balls which then fall towards the interior of the device, with the result that the member 83 is no longer retained and is ejected by the spring 78, thereby releasing the belt buckles.

As shown in FIGS. 8 and 9, the force which is necessary for the purpose of ejecting the spherical mass 64 can also be varied by suitably shaping the end 87 of the jaw against which the said ball is applied in fact, it is obvious that the larger the diameter $\varphi$ of the opening 92, or the greater the angle $\alpha$ of the conical portion 87a on which said ball rests, the greater the force F which will be necessary to eject the ball for a same force applied by means of the oil under pressure.

What I claim is:

1. A releasable locking device for a safety belt of a vehicle, said belt having ring means, comprising:

a body member having bore means;

latch means movably mounted on said body for engaging the ring means;

first spring means for moving said latch means away away from said engagement;

rod means axially movable in said bore means, said rod means being disposed in a position engageable with said latch member for preventing said movement thereof by the first spring means;

second spring means compressed between a portion of said rod means and a portion of said body member when said rod means is in said position;

a locking device including a movable, weighted mass mounted on said body for obstructing movement of said rod means out of said position by said second spring means, said mass being moved out of its position of obstruction by inertia in response to an abrupt change in the speed of the vehicle, whereby to free said rod means for movement by said second spring means and thereby to free said latch means for movement away from said engagement; and time-delay means connected with one of said rod means and said latch means for retarding the movement thereof under the urging of said spring means.

2. A device according to claim 1, in which the movable mass is connected to said body member; and including resiliently flexible means resisting movement of said weighted mass out of its position of obstruction.

3. A device according to claim 1, including a support member integral with and spaced from said body member, said support member being intersected by the extended axis of said bore means; and
wherein said movable mass comprises a sphere, the obstructing position of which is located between said support member and said body member along said extended axis.

4. A device according to claim 1, wherein said latch means comprises an elongated element having an external annular flange thereon, said element being axially slideably supported on said body member for movement transversely of said rod means, said first spring means being compressed between one side of said flange means and said body member when the other side of said flange means is in engagement with said rod means, said latch means including a slot in said body member into which the ring means is slideably disposed when said latch means is engaged therewith.

5. A device according to claim 4, wherein said body member has a chamber through which said elongated element extends, said flange means being slideably disposed within said chamber for movement therealong; and
wherein said time-delay means includes a liquid which is moved in said chamber around said flange means as said latch member is moved away from said engagement.

6. A device according to claim 1, wherein said body member has a relatively large opening extending transversely of and communicating with said bore means;
wherein said body member includes a pair of annular end members removably disposed within the opposite ends of said large opening; and
wherein said movable mass is slideably disposed within said large opening for movement into and out of said obstructing position, said mass having coaxial portions of reduced diameter extending from the opposite ends thereof and axially slideably disposed within the openings in said annular end members; and
including resilient means disposed in said opening on opposite sides of said mass, said resilient means being held under compression between said mass and said annular end members.

7. A device according to claim 1, including manually engageable means connected to said rod means for movement thereof into said position following an operation of said locking device.

8. A device according to claim 1, wherein said latch means includes a hook and pin means pivotally supporting said hook for movement around an axis transverse of the extended axis of said rod means, said hook including an integral element engageable with said rod means for holding same in engagement with said ring means when said rod means is in said position, said rod means being movable by said second spring means out of engagement with said integral element when said movable mass is moved out of said position of obstruction.

9. A device according to claim 8, wherein said body member has a chamber through which said rod means extends and said rod means has an annular external flange disposed within said chamber and movable with said rod means therealong; and
wherein said time-delay means includes fluid means disposed within said chamber, movement of said rod means by said second spring means necessitating movement of said fluid around said flange means from one side thereof to the other side thereof within said chamber.

References Cited by the Examiner
UNITED STATES PATENTS

| | | | |
|---|---|---|---|
| 2,071,903 | 2/1937 | Shively | 297—386 X |
| 2,608,812 | 9/1952 | Hutchings | 24—242 X |
| 2,650,655 | 9/1953 | Neahr | 297—386 |
| 2,667,376 | 1/1954 | Schlachter. | |
| 2,825,110 | 3/1958 | Verga. | |
| 2,845,677 | 8/1958 | Powell. | |
| 3,142,102 | 7/1964 | Saunders. | |

FOREIGN PATENTS

| | | |
|---|---|---|
| 1,087,884 | 3/1955 | France. |
| 1,258,697 | 3/1961 | France. |
| 521,304 | 3/1955 | Italy. |

WILLIAM FELDMAN, *Primary Examiner.*

DONLEY J. STOCKING, *Examiner.*